United States Patent
Hou et al.

(10) Patent No.: US 8,232,859 B2
(45) Date of Patent: Jul. 31, 2012

(54) MULTI-DIMENSIONAL CONTROLLING DEVICE

(75) Inventors: Buyuan Hou, Harbin (CN); Zhenghan Wang, Harbin (CN); Bo Cao, Harbin (CN)

(73) Assignee: Empire Technology Development LLC, Wilmington, DE (US)

( * ) Notice: Subject to any disclaimer, the term of this patent is extended or adjusted under 35 U.S.C. 154(b) by 347 days.

(21) Appl. No.: 12/539,338

(22) Filed: Aug. 11, 2009

(65) Prior Publication Data

US 2011/0037608 A1    Feb. 17, 2011

(51) Int. Cl.
    *G05B 19/02* (2006.01)
    *G05B 11/01* (2006.01)
    *G08B 5/22* (2006.01)

(52) U.S. Cl. ............ 340/4.3; 340/4.31; 340/6.1; 700/13

(58) Field of Classification Search .............. 340/825.49
See application file for complete search history.

(56) References Cited

U.S. PATENT DOCUMENTS

| 7,352,413 | B2 | 4/2008 | Liang |
| 2008/0163504 | A1* | 7/2008 | Smith et al. ............ 33/268 |
| 2008/0293490 | A1 | 11/2008 | Rhee |

FOREIGN PATENT DOCUMENTS

| CN | 201060550 Y | 5/2008 |
| JP | 2006-324900 A | 11/2006 |

* cited by examiner

*Primary Examiner* — Jennifer Mehmood
*Assistant Examiner* — John Mortell
(74) *Attorney, Agent, or Firm* — Brundidge & Stanger, P.C.

(57) ABSTRACT

A controlling device is provided and is configured to detect a device and to control the detected device. Alternatively, a controlling device is provided and is configured to detect a device and to receive at least one command from a remote control device. The controlling device may control the device using the received command.

19 Claims, 4 Drawing Sheets

MULTI-DIMENSIONAL CONTROLLING DEVICE

BACKGROUND

Infrared (IR) is commonly used as a method of communicating with devices in the home. In order to control a device remotely, a user must point the remote control at a device and push at least one button to control the device. As the number of devices in the home increases, the number of remote controls in the home increases. A universal remote controller may be used to control more than one device. However, a universal remote controller may be difficult not only to program, but also to use.

SUMMARY

An apparatus is described in the present disclosure, the apparatus including a controlling device sensing unit including a multi-axis geomagnetic sensor, and a multi-axis accelerometer.

The geomagnetic sensor may obtain a relative direction of the sensing unit to the Earth's magnetic field and the accelerometer may obtain a relative position of the sensing unit to a pre-selected reference point. The apparatus may further include a calculating unit configured to determine an azimuth of the apparatus using the relative direction obtained by the geomagnetic sensor, and to determine a location of the apparatus using the relative position obtained by the accelerometer.

The apparatus may further include a control unit configured to select a target device from a plurality of devices, and select the target device using the azimuth and relative position determined by the calculating unit.

The apparatus may further include a communication unit configured to transmit commands to control the target device and receive information from the target device; and an interaction unit configured to receive an input from the accelerometer based upon at least one change in a velocity of the apparatus and provide visual and sensory feedback based upon the information received from the target device.

The apparatus may further include a memory configured to store the commands for controlling the plurality of devices to be transmitted by the communication unit.

Alternatively, a controlling device is described in the present disclosure, the controlling device including a control unit configured to detect a reference data; a sensor unit configured to detect a controlled device from a plurality of devices based on the reference data; and a memory configured to store commands for controlling the controlled device.

The controlling device may further include an interaction unit configured to provide visual or sensory feedback, wherein the interaction unit provides at least one of a visual and sensory feedback when the device is aimed at one of the devices from the plurality of devices, and wherein the sensory feedback of the interaction unit includes a vibration of the controlling device.

Alternatively, a method is described in the present disclosure, the method including detecting a reference data on a controlling device; detecting whether a position relative to the reference data of the controlling device corresponds to a controlled device of a plurality of controlled devices stored in a memory; and providing at least one of a sensory feedback or a visual feedback when it is determined that the relative position of the controlling device corresponds to the one controlled device of the plurality of controlled devices.

The method may further include accessing commands associated with the one controlled device of the plurality of controlled devices; receiving an input to control the one controlled device of the plurality of controlled devices; and transmitting a command to the one controlled device of the plurality of controlled devices in response to the input received.

The method may further include determining the one controlled device of the plurality of controlled devices from a pre-stored relative position and a pre-determined relative azimuth of the controlling device.

The method may further include accessing a calibration mode on the controlling device defining a reference direction.

The method may further include storing the reference direction on the controlling device.

Alternatively, a method is described in the present disclosure, the method including detecting a reference data on a controlling device; accessing a registration mode on the controlling device; defining a controlling action on the controlling device; receiving at least one command configured to control a controlled device, from a remote controller of the controlled device; and storing the at least one command of the controlled device in a memory by associating the at least one command with the controlling action.

The method may further include accessing a calibration mode on the controlling device defining the reference direction.

The method may further include determining the reference data on the controlling device from a position of the controlling device.

The method may further include determining a position data on the controlling device from a position of the controlling device; associating the position data with controlled with the controlled device; and storing the position data on the controlling device.

The foregoing is a summary and thus contains, by necessity, simplifications, generalization, and omissions of detail; consequently, those skilled in the art will appreciate that the summary is illustrative only and is not intended to be in any way limiting. Other aspects, features, and advantages of the devices and/or processes and/or other subject matter described herein will become apparent in the teachings set forth herein. The summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

DETAILED DESCRIPTION

Figure 1:
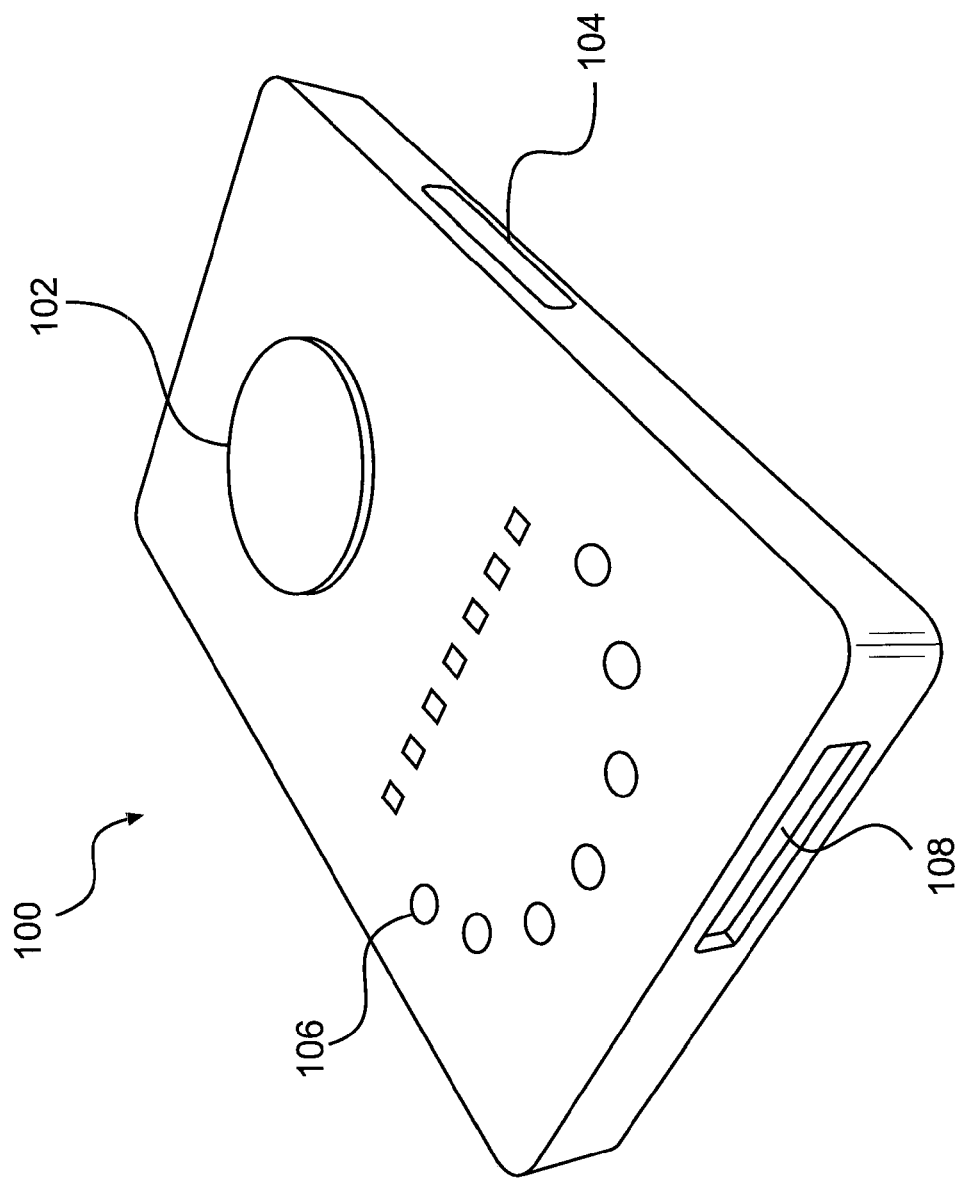
FIG. 1 illustrates one example embodiment of a multi-dimensional controlling device.

In the following detailed description, reference is made to the accompanying drawings, which form a part hereof. In the drawings, similar symbols typically identify similar components, unless the context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated and make part of this disclosure.

This disclosure is drawn, inter alia, to methods, apparatuses, computer-readable mediums having a set of instructions stored thereon, and program products related to a controlling device for controlling at least one device based at least in part on a position of the controlling device.

The controlling device may determine its position based on a sensing unit within the controlling device. Once the controlling device has determined its position, a memory in the controlling device may be accessed. A plurality of controlled devices may be stored in the memory together with associated position information and associated commands for controlling the respective devices. Based on the sensed position information, one of the plurality of controlled devices may be selected and the associated commands may be accessed. The controlling device may then control the controlled device based on the accessed commands.

FIG. 1 depicts a multi-dimensional controller apparatus, i.e., controlling device, 100. The controlling device 100 may be used to control switches, volume, channel selection, and many other functions of a wide range of domestic and industrial electronics rapidly and precisely. This may be done through a series of gestures, pointing the controller in a particular direction, pressing one or more buttons, switching one or more switches, etc. Controlling device 100 may be realized as a handheld portable device, such as a remote control device.

The controlling device 100 may include an input button 102. The input button 102 may be realized as a single rotatable knob. The input button 102 may be realized as a large push button located on an interaction face of the controlling device 100. Input button 102 may be realized as having a pressing functionality and/or a rotational functionality. The input button 102 may control operations that require accuracy, such as the brightness of lights, fan speed, opening/closing of curtains, sound volume, etc. These functions may be obtained by rotation, pressing, or other suitable movement of input button 102. It may be appreciated that one or more input buttons 102 may be implemented in controlling device 100.

The controlling device 100 may include a calibration button 104. The calibration button 104 may be used to initiate a calibration mode of controlling device 100 or a registration mode of controlling device 100.

The controlling device 100 may include indicator lights 106. The indicator light 106 may be implemented as one or more indicator lights, arranged in one or more rows of lights. Light emitting diodes (LEDs) or other appropriate illuminator can be used. The indicator light 106 may provide visual feedback in response to an input provided to the controlling device 100. For example, indicator lights 106 may illuminate, flash, or blink, thereby providing visual feedback when controlling device 100 is aimed at a device the controlling device 100 is controlling. Indicator lights may illuminate, flash, or blink when input button 102 is used to provide input to controlling device 100.

For example, controlling device 100 may be used to control the volume level of an electronic device. Input button 102 may be used in rotational manner, whereby rotating input button 102 in a clockwise direction would increase the volume of the electronic device, while rotating input button 102 in the counter clockwise direction would decrease the volume of the electronic device, or visa versa. When the input button 102 sets the volume to a minimum level, a minimum number of indicator lights 106 may be illuminated. When the input button 102 sets the volume to a maximum level, a maximum number of indicator lights 106 may be illuminated.

The controlling device 100 may also have a communications window 108. The communications window 108 may be realized by, for example, an infrared communications device. The infrared communications device may be used to communicate with a plurality of controlled devices, whereby the infrared communications device transmits commands to one of a plurality of controlled devices, and may also be used to receive commands from a remote control device of the one of the plurality of controlled devices. Other forms of transmission and reception can be realized, as may be appreciated by one skilled in the art.

Figure 2:
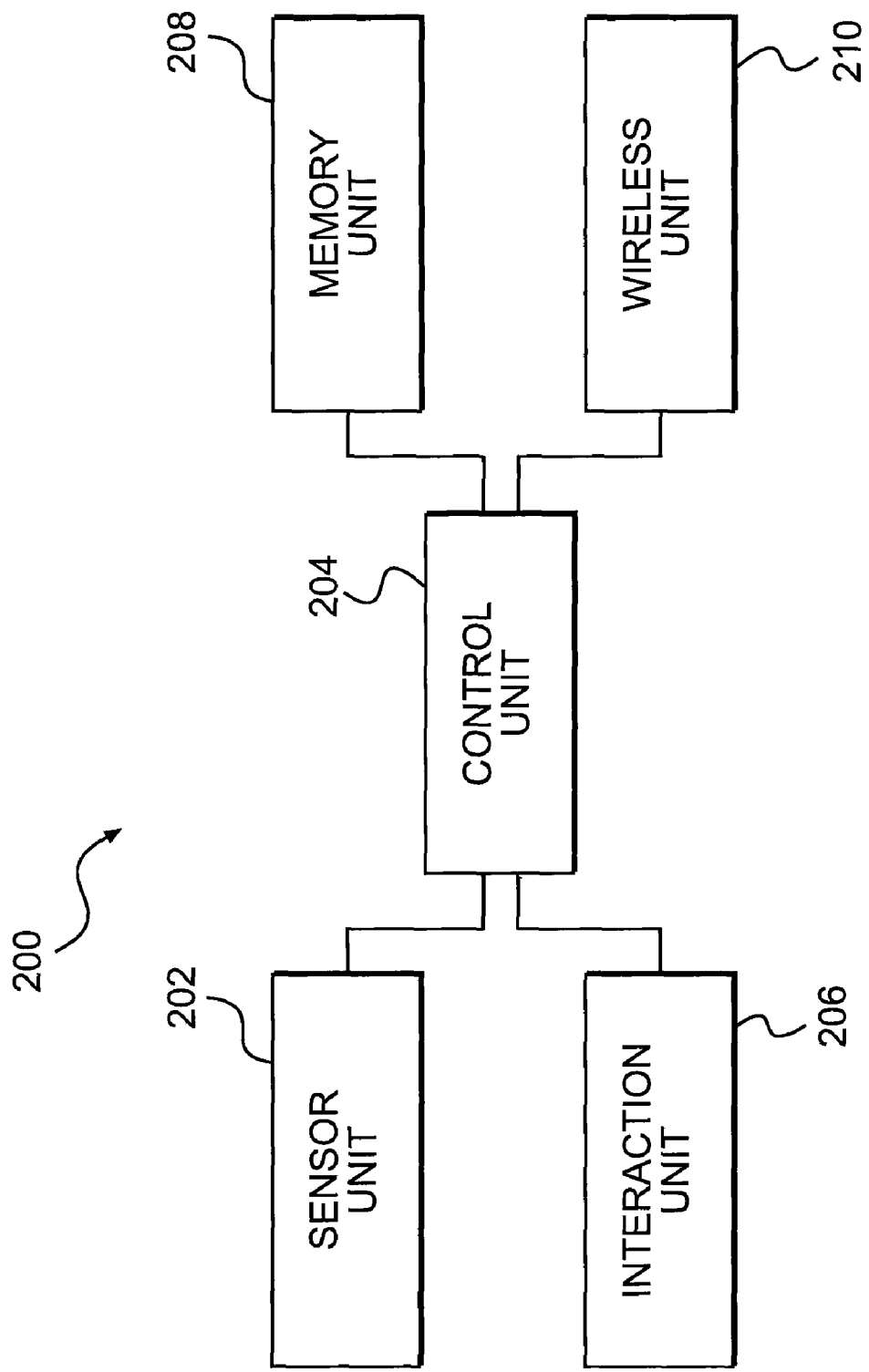
FIG. 2 illustrates a block diagram of a controlling device, according to an example embodiment.

FIG. 2 depicts a block diagram of one embodiment of a device 200. The device 200 may be implemented as, for example, controlling device 100. The device 200 may include a sensor unit 202. The sensor unit 202 may measure a pointing direction of the device 200. The sensor unit 202 may contain a multi-axis geomagnetic sensor. Examples of the geomagnetic sensor include a 2-axis geomagnetic sensor manufactured by Meixin Semiconductor Company. The geomagnetic sensor may be used to detect a relative direction of the device 200 with respect to the Earth's magnetic field.

The sensor unit 202 may include a multi-axis accelerometer. The accelerometer may be used to derive the angle between the equipment and a horizontal plane parallel to the Earth. The accelerometer may also be used to detect the movement direction of the device 200.

The device 200 may have a control unit 204. The control unit 204 may be configured to receive an input from the sensor unit 202. The input from the sensor unit 202 may be a pointing direction of the device 200 from a multi-axis geomagnetic sensor of the sensor unit 202, realized in a form of an x-axis data and a y-axis data. From the x-axis data and the y-axis data, control unit 204 can calculate an azimuth of the device 200. An example of the computation method is as follows:

Azimuth=90 ($x=0, y<0$)

Azimuth=270 ($x=0, y>0$)

Azimuth=180−[arctan($y/x$)]*180/Π ($x<0$)

Azimuth=−[arctan($y/x$)]*180/Π ($x>0, y<0$)

Azimuth=360−[arctan($y/x$)]*180/Π ($x>0, y>0$)

Control unit 204 may also be configured to receive an input from an accelerometer sensor of the sensor unit 202. The accelerometer may provide acceleration data to control unit 204. The control unit 204 may use the acceleration data to derive an angle between the controlled device and the horizontal plane parallel to the Earth. The acceleration data can also be used to determine the movement direction of the device 200.

The device 200 may contain an interaction unit 206. The interaction unit 206 may be configured to provide sensory or visual feedback. The sensory feedback may be in the form of vibrations of device 200. The visual feedback may be in the form of illumination of indictor lights of the device 200. The sensory or visual feedback by interaction unit 206 may be provided in response to an input by the control unit 204. For example, the control unit 204 may determine that device 200 is directed towards a device to be controlled by device 200, for example, a controlled device, and then control unit 204 may direct the interaction unit 206 to provide a visual feedback and/or sensory feedback to indicate device 200 is directed towards the controlled device.

The interaction unit 206 may also be configured to provide an input to control unit 204. Interaction unit 206 may contain a multi-axis accelerometer. The accelerometer may provide acceleration data to the control unit 204. The acceleration data may be used to determine movement of the device 200. Examples of acceleration data provided by the interaction unit 206 may be generated by the rotation of the device 200 or the shaking of the device 200. It may be appreciated that a variety of gestures may be used to interact with the controlling device, wherein each gesture may be associated with one command. The control unit may use the acceleration data to control the controlled device. For example, shaking the device 200 may direct the control unit 204 to power on the controlled device.

The memory unit 208 may be configured to provide a storage component to the device 200. The memory unit may be realized by a nonvolatile memory component, such as EEPROM. The memory unit 208 may be accessed by control unit 204 to store commands to control the plurality of controlled devices. The memory unit 208 may also be accessed by the control unit 204 to retrieve commands to control the plurality of controlled devices. Memory unit 208 may also store reference data provided by control unit 204. Control unit 204 may also retrieve reference data from memory unit 208.

The device may include a wireless unit 210. The wireless unit 210 may be realized by an infrared receiver, wireless transmitter, or other appropriate communication component. Wireless unit 210 may transmit commands to a controlled device at the direction of control unit 204. Wireless unit 210 may receive commands from a proprietary remote control device for a controlled device to be access by the control unit 204.

Figure 3:
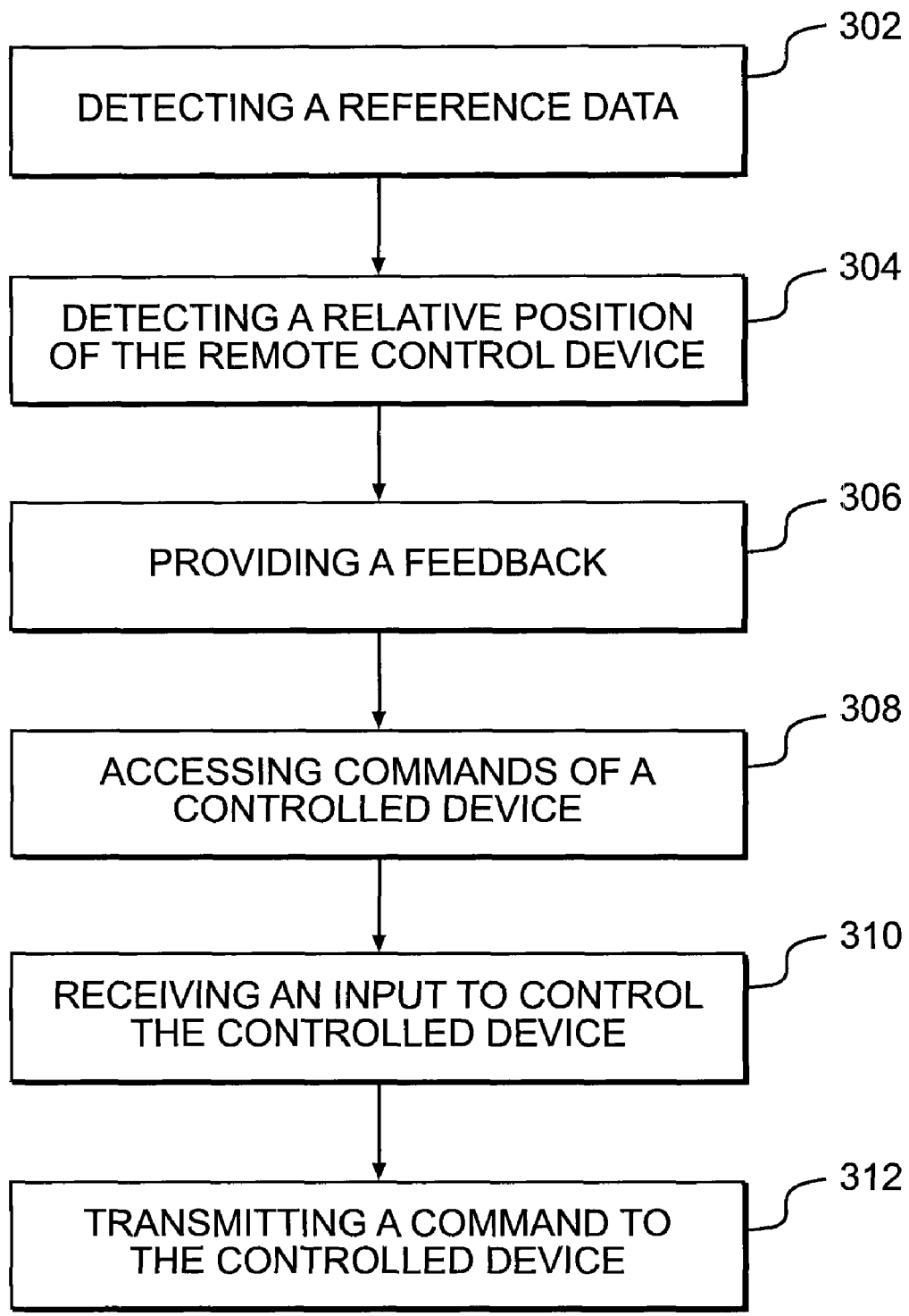
FIG. 3 illustrates a flow diagram illustrating a method of operation of a controlling device according to an example embodiment.

FIG. 3 illustrates a method of operation of a controlling device according to an example embodiment. The controlling device may be a remote control device. The controlling device may, for example, control an electronic device such as a television, stereo, household appliances, etc. The method as shown in FIG. 3 demonstrates operation of a controlling device.

Step 302 includes detecting a reference data on a controlling device. The reference data may be in the form of geomagnetic position information. The reference data may be used to determine the current location and orientation of the controlling device. The reference data may be obtained by accessing a calibration mode of the controlling device. The calibration mode may be accessed by receiving input at the controlling device representing, for example, a button press, etc.

Step 304 includes detecting whether a relative position of the controlling device corresponds to one of a plurality of controlled device stored in a memory. For example, the controlling device may monitor, for example, continuously, during predetermined time intervals, etc., the position of the controlling device. The controlling device may compare the monitored positions of the controlling device with positions stored in memory corresponding to one of a plurality of controlled devices. The controlling device can be used to control multiple controlled devices. For example, the controlling device may access information stored in memory in a table, wherein the information associates each of a plurality of controlled devices with position information. If the position information is located in memory, the controlled device associated with the position is determined, i.e., selected, from the plurality of controlled devices. As a result of step 304, the controlling device determines, or selects, the controlled device associated with the position. Thus, the controlling device configures itself to interface with the selected controlled device.

Step 306 includes providing a sensory feedback and/or a visual feedback when it is determined that the relative position of the controlling device corresponds to one controlled device of the plurality of controlled devices. After the controlling device determines one of the multiple controlled devices associated with the position, the controlling device provides an indication confirming a determined controlled device. The sensory feedback may be in form of vibrations of the controlling device, may be in the form of the illumination of lights on the controlling device, etc.

Step 308 includes accessing commands associated with the one controlled device of the plurality of controlled devices. After the determining step in step 304, the commands to control the controlled device are accessed from memory. These commands may include, for example, a command to power on the controlled device or a command to change the volume of the controlled device.

Step 310 includes receiving an input to control the one controlled device of the plurality of controlled devices. The input may include, for example, an input to provide a command to power on the controlled device, a command to change the volume of the controlled device, etc. The input could be in the form of a special movement of the controlling device, for example, a rotation of the controlling device, a shaking of the controlling device, etc. Based on the movement determined by the sensor unit, the associated command may be determined.

Step 312 includes transmitting a command to the determined controlled device in response to the input received. The transmitting of the command may be achieved using, for example, an infrared communication device, wireless, communication device, or other appropriate communication media, as may be appreciated by one skilled in the art.

Based on the method discussed with regard to FIG. 3, a controlled device may be controlled based on movement of the controlling device. Thus, it is possible to transmit a command to a controlled device without requiring a user to remember a button sequence for a command to control a controlled device. It may be appreciated that once the controlled device is acknowledged, the controlling device may receive multiple commands to control the controlled device without having to keep determining the controlled device. For example, the controlling device may recognize the determined control device until input is received indicating that a different controlled device should be determined.

Figure 4:
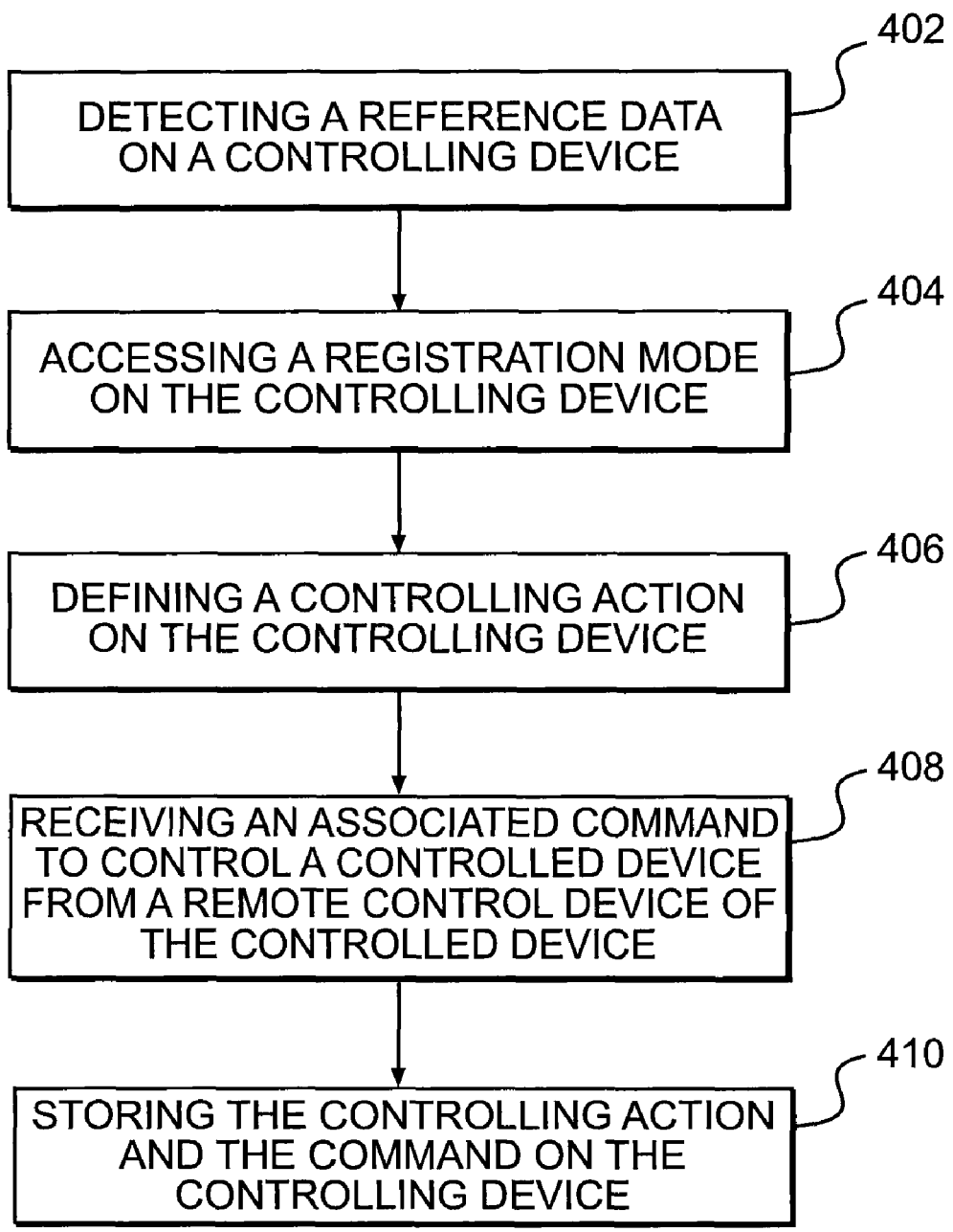
FIG. 4 illustrates a flow diagram illustrating a method of operation of a controlling device according to an example embodiment.

FIG. 4 illustrates a schematic flow chart illustrating a method of operation of a controlling device according to an example embodiment. The method may be used, for example, to program a controlling device.

Step 402 includes detecting a reference data using the geomagnetic sensor on a controlling device. The reference data may be in the form of geomagnetic position information. The reference data may be used to determine the current location and orientation of the controlling device as may be appreciated by one skilled in the art. The reference data may be obtained by accessing an assessment mode of the controlling device.

Step 404 includes accessing a registration mode on the controlling device to register a controlled device and the associated commands for the controlled device. The registration mode may be entered by receiving an indication, for example, of a depression of a registration button, etc. The controlling device may confirm the registration mode is accessed by, for example, illuminating indicator lights on the controlling device, etc.

The registration mode may further include determining a position data of the controlling device based on the reference data. The determining of the position data may occur when the controlling device is aligned with, or pointed at, the controlled device and the controlling device received an indication from a user that, for example a button has been pressed. The controlling device may use a geomagnetic sensor and/or an accelerometer to determine the position data of the controlling device. The controlling device may associate the position data with the controlled device in response to an input provided to the controlling device. The position of the controlling device may be stored on the controlling device. A feedback may be provided when the position data associates with the controlled device.

For example, the controlling device may be pointed towards an electronic device, such as a television, a button is depressed on the controlling device, and the controlling device determined the position of the controlling device and stores the position with identifying information of the electronic device, thereby registering the electronic device with the controlling device. The identifying information may be provided by a user through a graphical user interface, as may be appreciated by one skilled in the art.

Step 406 includes defining a controlling action on the controlling device. The defining of the controlling action may be initiated by receiving an indication of an input provided to the controlling device, for example, the depression of a button. After the controlling device receives an indication of an input to initiate the defining of a controlling action, the controlling device may capture and store a movement of the controlling device, i.e., a controlling action provided to the controlling device. The controlling action may include, for example, rotation or shaking of the controlling device, etc. The rotation or shaking of the controlling device may be detected by a geomagnetic sensor and/or an accelerometer, which may capture movement values relating to the provided controlling action. The button may be depressed during the entire controlling action. By the user releasing the button, the user may indicate the end of the controlling action. The controlling device may have pre-determined values corresponding to possible controlling actions on the controlling device. For example, the controlling action may be a clockwise rotation of the controlling device, as detected by the accelerometer of the controlling device, which may be used to operate a controlled device, such as powering on the controlled device by the clockwise rotation of the controlling device.

Step 408 includes receiving at least one command configured to control the controlled device, from a proprietary remote control device of the controlled device, corresponding to the associated controlling action. The receiving of the command may be achieved by directing a communications window of the controlling device to the communications window of the proprietary remote control device of the controlled device. The remote control device of the controlled device may issue or transmit one or more commands that may be used to control the controlled device to the controlling device. The controlling device may then detect or register the command issued by the remote control device of the controlled device. A feedback may be provided in response to the detection or registration of the command issued by the proprietary remote control of the controlled device.

Step 410 includes storing the received at least one command of the controlled device and the controlling action in a memory unit, wherein the command is associated with the controlling action. The controlling action may be stored by position and acceleration values determined by the geomagnetic sensor and/or an accelerometer in Step 406. The command may be stored in a nonvolatile memory such as EEPROM. As a result of this method, the controlling device has learned, or registered a command for controlling the controlled device. The command may later be accessed to control the controlled device. Steps 406, 408, and 410 may be repeated for additional commands.

By providing the method discussed with regard to FIG. 4, a user may create custom commands based on movement of the controlling device. This avoids the need for a user to remember button combinations in order to control controlled devices.

It may be appreciated that the above steps can be repeated for multiple commands. The above steps may further be repeated for a plurality of controlled devices.

There is little distinction left between hardware and software implementations of aspects of systems; the use of hardware or software is generally (but not always, in that in certain contexts the choice between hardware and software can become significant) a design choice representing cost vs. efficiency tradeoffs. There are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.).

The herein described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to disclosures containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

The invention claimed is:

1. An apparatus, comprising:
    a controlling device sensing unit configured to determine a position of the apparatus, the controlling device sensing unit comprising:
    a multi-axis geomagnetic sensor configured to obtain a relative direction of the apparatus to the Earth's magnetic field, and
    a multi-axis accelerometer configured to obtain acceleration data of the apparatus;
    a control unit configured to:
    determine an azimuth of the apparatus using the relative direction obtained by the geomagnetic sensor,
    determine a movement direction of the apparatus using the acceleration data obtained by the accelerometer,
    select a target electronic device for the apparatus to control from a plurality of electronic devices of which associated position information and associated controlling commands are stored in a memory in the apparatus using at least one of the determined azimuth and movement direction, and
    control the target device by transmitting the associated controlling commands for the selected target electronic device.

2. The apparatus as recited in claim 1, further comprising:
    a communication unit configured to transmit the associated controlling commands to control the target device and receive information from the target device; and
    an interaction unit configured to receive an input from the accelerometer based upon at least one change in a velocity of the apparatus and provide visual and sensory feedback based upon information received from the target device.

3. The apparatus as recited in claim 2, wherein the memory is configured to store the associated controlling commands for controlling the plurality of devices to be transmitted by communication unit.

4. A controlling device, comprising:
   a control unit configured to calculate position information of the controlling device;
   a sensor unit configured to detect a device configured to be controlled by the controlling device from a plurality of devices based on the calculated position information of the controlling device;
   a memory configured to store associated controlling commands for controlling the device configured to be controlled by the controlling device;
   an interaction unit configured to provide visual or sensory feedback when the controlling device is aimed at the device configured to be controlled by the controlling device,
      wherein the sensory feedback of the interaction unit includes a vibration of the controlling device; and
   a communications unit configured to transmit the associated controlling commands for controlling the device configured to be controlled by the controlling device.

5. A method, comprising:
   calculating position information of a controlling device;
   detecting whether a position relative to the calculated position information of the controlling device corresponds to position information for one of a plurality of devices configured to be controlled by the controlling device stored in a memory of the controlling device; and
   providing at least one of a sensory feedback or a visual feedback when it is determined that the relative position of the controlling device corresponds to the position information for the one of the plurality of devices configured to be controlled by the controlling device.

6. The method of claim 5, further comprising:
   accessing at least one controlling command associated with the one of the plurality of devices configured to be controlled by the controlling device;
   receiving an input to control the one of the plurality of devices configured to be controlled by the controlling device; and
   transmitting a controlling command to the one of the plurality of devices configured to be controlled by the controlling device in response to the input received.

7. The method as recited in claim 5, further comprising:
   accessing a calibration mode on the controlling device defining a reference direction.

8. The method as recited in claim 7, further comprising:
   storing the reference direction on the controlling device.

9. A method, comprising:
   detecting position information on a controlling device;
   receiving, from a control unit, at least one command configured to control a device configured to be controlled by the controlling device, associated with the detected position information; and
   storing the received at least one command of the device configured to be controlled by the controlling device by associating the at least one command with the controlling action in a memory of the controlling device.

10. The method as recited in claim 9, further comprising:
    accessing a calibration mode on the controlling device defining a reference direction.

11. The method as recited in claim 9, further comprising:
    determining the position information on the controlling device from a position of the controlling device.

12. The controlling device as recited in claim 4, wherein the communications unit is configured to transmit the controlling commands as commanded by the control unit.

13. The controlling device as recited in claim 4, wherein the communications unit is configured to transmit the controlling commands using infrared signals.

14. The controlling device as recited in claim 4, wherein the communications unit is configured to transmit the controlling commands using a wireless transmitter.

15. The method as recited in claim 5, wherein the input to control the one of the plurality of devices configured to be controlled by the controlling device is received from a control unit on the controlling device.

16. The method as recited in claim 5, wherein the controlling command is transmitted to the one of the plurality of devices configured to be controlled by the controlling device by an infrared signal.

17. The method as recited in claim 5, wherein the controlling command is transmitted to the one of the plurality of devices configured to be controlled by the controlling device by a wireless transmission.

18. The method as recited in claim 9, wherein the at least one command configured to control the device configured to be controlled by the controlling device is received in the form of an IR transmission.

19. The method as recited in claim 9, wherein the at least one command configured to control the device configured to be controlled by the controlling device is received in the form of a wireless transmission.

* * * * *

UNITED STATES PATENT AND TRADEMARK OFFICE
CERTIFICATE OF CORRECTION

PATENT NO. : 8,232,859 B2  
APPLICATION NO. : 12/539338  
DATED : July 31, 2012  
INVENTOR(S) : Hou et al.

Page 1 of 1

It is certified that error appears in the above-identified patent and that said Letters Patent is hereby corrected as shown below:

In the claims

Column 10, Line 44, Claim 1, delete "apparatus;" and insert -- apparatus; and --, therefor.

Column 10, Line 56, Claim 1, delete "control the target" and insert -- control the selected target electronic --, therefor.

Column 10, Line 62, Claim 2, delete "target" and insert -- selected target electronic --, therefor.

Column 10, Line 66, Claim 2, delete "target" and insert -- selected target electronic --, therefor.

Column 11, Line 4, Claim 3, delete "communication" and insert -- the communication --, therefor.

Column 11, Line 43, Claim 6, delete "transmitting a" and insert -- transmitting the at least one --, therefor.

Column 12, Line 7, Claim 9, delete "device," and insert -- device and --, therefor.

Column 12, Line 11, Claim 9, delete "with the" and insert -- with a --, therefor.

Column 12, Line 28, Claim 15, delete "claim 5," and insert -- claim 6, --, therefor.

Column 12, Line 30, Claim 15, delete "from a" and insert -- from the --, therefor.

Column 12, Line 32, Claim 16, delete "claim 5, wherein the" and insert -- claim 6, wherein the at least one --, therefor.

Column 12, Line 36, Claim 17, delete "claim 5, wherein the" and insert -- claim 6, wherein the at least one --, therefor.

Signed and Sealed this  
Twenty-sixth Day of July, 2016

Michelle K. Lee  
*Director of the United States Patent and Trademark Office*